(12) United States Patent
Kinoshita et al.

(10) Patent No.: US 10,427,108 B2
(45) Date of Patent: Oct. 1, 2019

(54) ZEOLITE FILM STRUCTURE

(71) Applicant: NGK INSULATORS, LTD., Nagoya-Shi (JP)

(72) Inventors: Naoto Kinoshita, Nagoya (JP); Hiroyuki Shibata, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 57 days.

(21) Appl. No.: 15/689,372

(22) Filed: Aug. 29, 2017

(65) Prior Publication Data

US 2017/0361282 A1   Dec. 21, 2017

Related U.S. Application Data

(63) Continuation of application No. PCT/JP2016/059047, filed on Mar. 22, 2016.

(30) Foreign Application Priority Data

Mar. 31, 2015 (JP) ................. 2015-071568

(51) Int. Cl.
| | | |
|---|---|---|
| C01B 39/02 | (2006.01) | |
| C01B 37/02 | (2006.01) | |
| B32B 19/04 | (2006.01) | |
| B01D 69/02 | (2006.01) | |
| B01D 69/12 | (2006.01) | |
| B01D 71/02 | (2006.01) | |

(52) U.S. Cl.
CPC ........... *B01D 71/028* (2013.01); *B01D 69/02* (2013.01); *B01D 69/12* (2013.01); *B32B 19/04* (2013.01); *C01B 39/02* (2013.01); *B01D 2325/04* (2013.01); *C01B 37/02* (2013.01)

(58) Field of Classification Search
None
See application file for complete search history.

(56) References Cited

U.S. PATENT DOCUMENTS

| | | |
|---|---|---|
| 2005/0070424 A1 | 3/2005 | Chiang et al. |
| 2008/0217240 A1 | 9/2008 | Yabuki et al. |
| 2014/0208707 A1 | 7/2014 | Teranishi et al. |
| 2014/0331860 A1* | 11/2014 | Isomura ................. B01D 69/12 95/52 |
| 2016/0016125 A1 | 1/2016 | Uchikawa et al. |

FOREIGN PATENT DOCUMENTS

| | | |
|---|---|---|
| CN | 1382519 A | 12/2002 |
| JP | H08-26720 A | 1/1996 |
| JP | 2002-253919 A1 | 9/2002 |
| JP | 2005-095851 A1 | 4/2005 |
| JP | 2008-094664 A1 | 4/2008 |
| JP | 2018-149734 A | 9/2018 |
| WO | 2013/054794 A1 | 4/2013 |
| WO | 2013/129625 A1 | 9/2013 |
| WO | 2014/156579 A1 | 10/2014 |

OTHER PUBLICATIONS

International Search Report and Written Opinion (Application No. PCT/JP2016/059047) dated Jun. 21, 2016.
English translation of International Preliminary Report on Patentability (Chapter I) (Application No. PCT/JP2016/059047) dated Oct. 12, 2017, 7 pages.
Indonesian Office Action (with English translation), Indonesian Application No. PID201706635, dated Apr. 26, 2019 (4 pages).

* cited by examiner

*Primary Examiner* — Sheeba Ahmed
(74) *Attorney, Agent, or Firm* — Burr & Brown, PLLC

(57) ABSTRACT

A zeolite film structure comprising a support, a zeolite film and a protective film. The zeolite film is formed on a surface of the support. The protective film is formed on a surface of the zeolite film. The protective film is configured from organic-nonorganic hybrid silica or carbon. An average thickness of the protective film is less than or equal to 172 nanometers and greater than or equal to 44 nanometers.

5 Claims, 1 Drawing Sheet

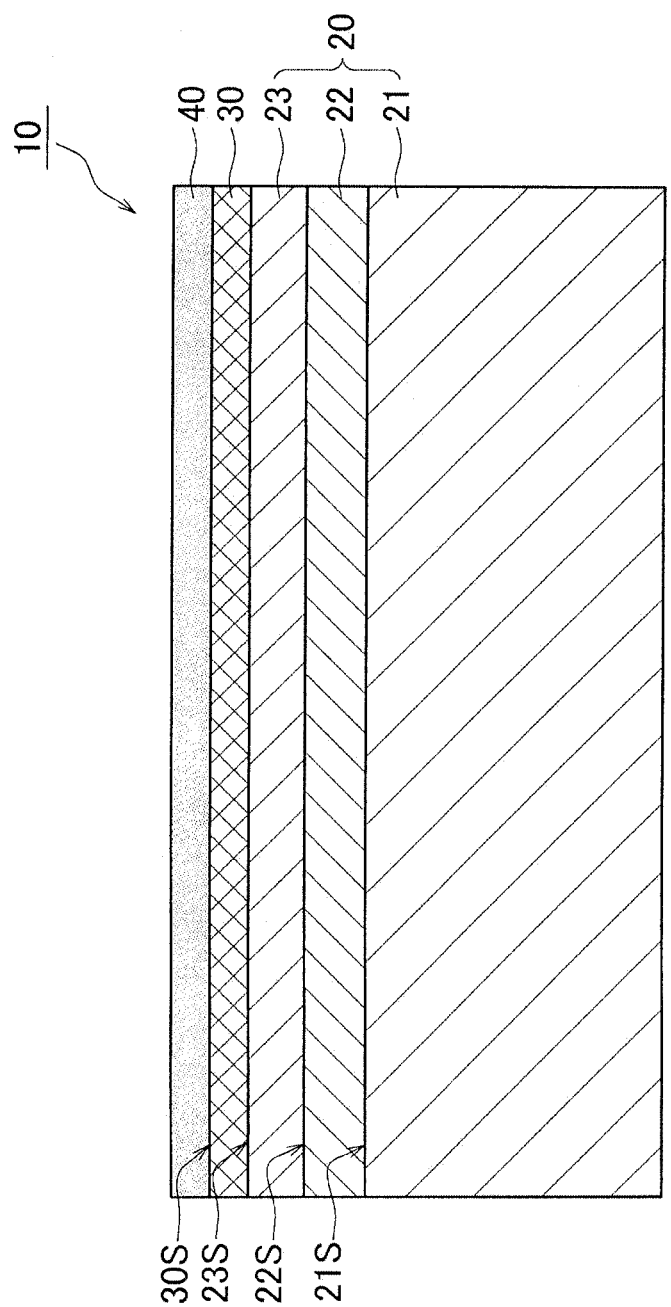

ZEOLITE FILM STRUCTURE

TECHNICAL FIELD

The present invention relates to a zeolite film structure provided with a zeolite film.

BACKGROUND ART

A ceramic filter provided with a zeolite film formed on a support exhibits superior mechanical strength compared to a polymer film, and therefore is suitable for application in relation to separation or condensation of a desired component from a liquid mixture and gaseous mixture (for example, reference is made to PCT Laid Open Application 2013/054794).

SUMMARY OF THE INVENTION

Technical Problem

However, there remains a need for further enhancement of the durability of the zeolite film.

The present invention is proposed in light of the situation described above, and has the purpose of providing a zeolite film structure with enhanced durability.

Solution to Problem

The zeolite film structure of the present invention includes a support, a zeolite film, and a protective film. The zeolite film is formed on a surface of the support. The protective film is formed on a surface of the zeolite film. The protective film is configured from organic-nonorganic hybrid silica or carbon.

Effect of Invention

The present invention enables the provision of a zeolite film structure with enhanced durability.

BRIEF DESCRIPTION OF THE DRAWINGS

FIG. 1 is a cross sectional view of a zeolite film structure.

DESCRIPTION OF EMBODIMENTS

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different between the figures.

Structure of Separation Film Structure 100

FIG. 1 is a cross sectional view of a separation film structure 10. The separation film structure 10 includes a support 20, a zeolite film 30 and a protective film 40.

The support 20 supports the zeolite film 30. The support 20 exhibits chemical stability that enables the formation (crystallization, coating, or precipitation) of the zeolite film 30 in a film configuration. The support 20 may be configured in a shape to enable supply a mixed fluid that is the subject matter to be separated to the zeolite film 30. The shape of the support 20 for example may be configured in a honeycomb, monolithic, flat, tubular, cylindrical, columnar, square column shape, or the like.

In the present embodiment, the support 20 includes a substrate 21, an intermediate layer 22 and a surface layer 23.

The substrate 21 is configured from a porous material. The porous material includes for example, a sintered ceramic, a metal, an organic polymer, glass, carbon or the like. The sintered ceramic includes alumina, silica, mullite, zirconia, titania, yttria, silicon nitride, silicon carbide, or the like. The metal includes aluminum, iron, bronze, silver, stainless steel, or the like. The organic polymer includes polyethylene, polypropylene, polytetrafluoroethylene, polysulfone, polyimide or the like.

The substrate 21 may include an inorganic binder. The inorganic binder may include use of at least one of titania, mullite, sinterable alumina, silica, glass frits, clay minerals, and sinterable cordierite.

The average particle diameter of the substrate 21 may be configured for example as 5 microns to 25 microns. The average particle diameter of the substrate 21 may be measured by use of a mercury porosimeter. The porosity of the substrate 21 may be configured for example as 25% to 50%. The average particle diameter of the porous material that configures the substrate 21 may be configured for example as 5 microns to 100 microns. The average particle diameter of the substrate 21 is the value of the arithmetic mean for the maximum diameter of 30 measured particles that are measured by cross sectional micro-structure observation by use of a scanning electron microscope (SEM).

The intermediate layer 22 is formed on the substrate 21. The intermediate layer 22 can be configured by the same porous material as that used in the substrate 21. The average pore diameter of the intermediate layer 22 may be smaller than the average pore diameter of the substrate 21, and may be configured for example as 0.005 microns to 2 microns. The average pore diameter of the intermediate layer 22 may be measured by use of a perm-porometer. The porosity of the intermediate layer 22 may be configured for example as 20% to 60%. The average thickness of the intermediate layer 22 may be configured for example as 30 microns to 300 microns.

The surface layer 23 is formed on a surface 22S of the intermediate layer 22. The surface layer 23 can be configured by the porous material that can be used in the substrate 21. The average pore diameter of the surface layer 23 may be smaller than the average pore diameter of the intermediate layer 22, and for example may be 0.001 microns to 0.5 microns. The average pore diameter of the surface layer 23 may be measured by use of a perm-porometer. The porosity of the surface layer 23 may be configured for example to 20% to 60%. The average thickness of the surface layer 23 for example may be configured as 1 micron to 50 microns.

The surface layer 23 includes a surface 23S that makes contact with the zeolite film 30. The surface 23S is the uppermost surface of the support 20. The surface roughness Ra of the surface 23S is preferably less than or equal to 2.13 microns. The surface roughness Ra of the surface 23S is preferably greater than or equal to 0.29 microns. The surface roughness Ra of the surface 23S can be measured according to JIS B0601 using a cross sectional curve having a length of 25 microns that is obtained using SEM.

The zeolite film 30 is formed on the surface 23S of the surface 23. Although there is no particular limitation in relation to the framework structure (type) of the zeolite that contains the zeolite film 30 as a principal component, for example, MFI, LTA, CHA, DDR, MOR, DOH, FAU, OFF/ ERI, LTL, FER, BEA, BEC, CON, MSE, MEL, MTW, MEI, MWW, RHO, BOG, SZR, EMT, SOD, AEI, AEL, AEN, AET, AFN, AFO, AFR, AFS, AFT, AFI, AFX, ANA, CAN, GIS, GME, HEU, JBW, KFI, LAU, LEV, MAZ, MER, MFS, MTT, PHI, SFG, TUN, TON, UFI, VET, VFI, VNI, and VSV or the like. In particular, MFI, DDR, MEL, BEA, CHA, MOR, FAU, LTA, FER, SOD that facilitate crystallization of zeolite are preferred, and MFI, DDR, MEL, BEA, CHA that exhibit high chemical stability are particularly preferred.

In the present embodiment, the term such that composition X "contains as a principal component" material Y means that material Y preferably occupies greater than or equal to 60 wt %, more preferably occupies greater than or equal to 70 wt %, and still more preferably occupies greater than or equal to 90 wt % of the total of composition X.

The zeolite film 30 may contain an inorganic binder (silica or alumina or the like), an organic binder (a polymer or the like), or a silylating agent, or the like.

There is no particular limitation in relation to the Si/Al atomic ratio in the zeolite film 30, and for example it may be configured as greater than or equal to 1.5. The zeolite film 30 may be configured by a high-silica zeolite having an Si/Al atomic ratio of greater than or equal to 200. This type of high-silica zeolite may substantially contain no or almost no aluminum, and is characterized by high corrosion resistance and low incidence of film defects. The Si/Al atomic ratio in the zeolite film 30 can be adjusted by controlling the reaction conditions or the reaction solution used in hydrothermal synthesis. The Si/Al atomic ratio in the zeolite film 30 can be measured using SEM-EDX (scanning electron microscope energy dispersive X-ray spectroscopy).

There is no particular limitation on the average thickness of the zeolite film 30, and for example, it may be configured as 0.1 micron to 10 microns. The permeation amount tends to increase when the zeolite film 30 has a thin configuration, and the selectivity or film strength tend to be enhanced when the zeolite film 30 has a thick configuration. The thickness of the zeolite film 30 can be adjusted by controlling the hydrothermal synthesis time.

The zeolite film 30 includes pores. There is no particular limitation on the average pore diameter of the zeolite film 30, and it may be determined in response to the liquid mixture or gaseous mixture that is the subject matter to be separated. The average pore diameter of the zeolite film 30 may be adjusted for example by modifying the size or type of a template or a structure regulating agent to thereby specify a framework structure for the zeolite. The average pore diameter of the zeolite film 30 may be configured for example as 0.2 nanometers to 2.0 nanometers. A long diameter and a short diameter may be included in the average pore diameter of the zeolite film 30. For example, the short diameter of the pore of a DDR-type zeolite film is 0.36 nanometers and the long diameter is 0.44 nanometers.

The zeolite film 30 includes a surface 30S that comes into contact with the protective film 40. There is no particular limitation on the surface roughness Ra of the surface 30S, and it is preferably less than or equal to 1.74 microns. In this manner, it is possible to enhance the peeling strength of the protective film 40 that is described below. The surface roughness Ra of the surface 30S is preferably greater than or equal to 0.28 microns. In this manner, it is possible to enhance the adhesive characteristics of the protective film 40 and the zeolite film 30. The surface roughness Ra of the surface 30S can be measured according to JIS B0601 using a cross sectional curve having a length of 25 microns that is obtained using SEM.

The protective film 40 is formed on the surface 30S of the zeolite film 30. The protective layer 40 covers the surface 30S of the zeolite film 30. In this manner, a configuration is enabled in which steam or water contained in the liquid mixture or gaseous mixture that is the subject matter to be separated does not come into direct contact with the zeolite film 30. As a result, it is possible to inhibit defects caused by decomposition by water or steam of a portion of the zeolite film 30.

The protective film 40 is configured to an organic-nonorganic hybrid silica material or carbon material.

The organic-nonorganic hybrid silica material is a configuration in which an organic component and an inorganic component are chemically bonded, or a configuration in which an organic component and an inorganic component are mixed. The organic-nonorganic hybrid silica material includes a silane coupling agent, or a configuration that is obtained by hydrolyzing and dehydrating alkoxysilane. More specifically, it is possible to use a configuration obtained by hydrolysis and condensation of bis-triethoxysilyl compounds having a structural formula of $(C_2H_5O)_3SiC_nH_{2n}Si(C_2H_5O)_3$ ($n \geq 1$). This material is in a state in which an organic component and an inorganic component containing silicon are chemically bonded.

The carbon material includes use of a material used in known separation films. The materials for use in a separation film are disclosed in detail in Japanese Patent Application Laid-Open No. 2003-286018.

The organic-nonorganic hybrid silica material or carbon material is a porous water-resistant material. Consequently, the production of defects in the protective film 40 itself as a result of water or steam contained in the liquid mixture or gaseous mixture that is the subject matter to be separated can be inhibited.

The average thickness of the protective film 40 can be configured as 30 nanometers to 300 nanometers. The average thickness of the protective film 40 is preferably less than or equal to 172 nanometers. In this manner, the production of cracks in the protective film 40 or the zeolite film 30 in the drying or firing steps described below can be inhibited. The average thickness of the protective film 40 is preferably greater than or equal to 44 nanometers. In this manner, the durability of the protective film 40 can be further enhanced.

In the present embodiment, the "average thickness" of the respective films is the value of the arithmetic average for the thickness of 10 arbitrary positions that are measured by cross sectional micro-structure observation using a transmission electron microscope (TEM).

Method of Manufacturing Separation Film Structure

A method of manufacturing the separation film structure 10 will be described below.

Firstly, a green body for the substrate 21 is formed into a desired shape by use of extrusion molding, a press molding method, a slip cast method, or the like. Next, the green body for the substrate 21 is fired (for example, 900 degrees C. to 1450 degrees C.) to thereby form the substrate 21.

Then, an intermediate layer slurry is formulated by use of a ceramic material having a desired particle diameter and is formed as a film on a surface 21S of the substrate 21 to thereby form a green body for the intermediate layer 22. Next, the green body for the intermediate layer 22 is fired (for example, 900 degrees C. to 1450 degrees C.) to thereby form the intermediate layer 22.

Then, a surface layer slurry is formulated by use of a ceramic material having a desired particle diameter and is formed as a film on a surface 22S of the intermediate layer 22 to thereby form a green body for the surface layer 23. Next, the green body for the surface layer 23 is fired (for example, 900 degrees C. to 1450 degrees C.) to thereby form the surface layer 23.

Next, a slurry for seeding in which the zeolite seed crystals are dispersed in alcohol is coated onto the surface 23S of the surface layer 23 by a method such as a flow-down method, a dipping method or the like.

Next, the support 20 with the zeolite seed crystals attached thereto is immersed inside a pressure-resistant vessel containing a starting material solution that includes a silica source, an alumina source, an alkali source, and water or the like.

Next, the pressure-resistant vessel is placed in a drying unit and subjected to heating (hydrothermal synthesis) for about 1 to 240 hours at 100 to 200 degrees C. to thereby cause crystal growth of the zeolite seed crystals into a film configuration.

Next, the support 20 formed the zeolite film 30 is washed and dried at 80 to 100 degrees C. Then, in a configuration in which an organic template is included in the starting material solution, the support 20 is placed in an electric furnace, and heated in an atmosphere of air (400 to 800 degrees C., 1 to 200 hours) to thereby combust and remove the organic template.

The protective layer 40 is formed on the surface 30S of the zeolite film 30. In the following description, a method is described of forming an organic-nonorganic hybrid silica film as the protective layer 40.

Firstly, an organic-nonorganic hybrid silica that is obtained by hydrolyzing and dehydrating an alkoxysilane or a silane coupling agent is decomposed in a solvent such as alcohol or the like to thereby prepare a sol.

Next, the sol is coated onto the surface 30S of the zeolite film 30 and drying with air is performed. The air speed at this time is preferably greater than or equal to 5.0 m/s and less than or equal to 10 m/s, and more preferably, greater than or equal to 6.0 m/s and less than or equal to 9.0 m/s. In this manner, suitable drying can be performed at ambient temperature. The air temperature is preferably greater than or equal to 10 degrees C. and less than or equal to 80 degrees C. In this manner, it is possible to rapidly perform drying while suppressing crack formation or the like in the film surface. Furthermore, the wind dew point is preferably lower than the blast temperature, and for example may be configured as greater than or equal to −70 degrees C. and less than or equal to 70 degrees C. The dew point temperature can be reduced through absorbing moisture by use of a dehumidifying rotor having a honeycomb structure with an absorbing agent strongly bonded thereto. In this manner, a uniform sol coating can be formed by blast drying the sol. Furthermore, in comparison to natural drying of the sol, it is possible to obtain a uniform coating film thickness, rapid drying of the coated film and inhibition of dew condensation.

The organic-nonorganic hybrid silica film is formed by heating the dried sol at a temperature of 300 degrees C. to 350 degrees C. in a reducing atmosphere.

OTHER EMBODIMENTS

In the present embodiment, although the support 20 includes the substrate 21, the intermediate layer 22 and the surface layer 23, one or both of the intermediate layer 22 and the surface layer 23 may be omitted.

In a configuration in which the support 20 does not include the surface layer 23, the zeolite film 30 is formed on the surface 22S of the intermediate layer 22. In this configuration, the surface roughness Ra of the surface 22S is preferably less than or equal to 2.13 microns, and preferably greater than or equal to 0.29 microns.

In a configuration in which the support 20 does not include the intermediate layer 22 and the surface layer 23, the zeolite film 30 is formed on the surface 21S of the substrate 21. In this configuration, the surface roughness Ra of the surface 21S is preferably less than or equal to 2.13 microns, and preferably greater than or equal to 0.29 microns.

In the present embodiment, although the zeolite film 30 is formed by use of zeolite seed crystals, the zeolite film 30 may be formed without the use of zeolite seed crystals.

EXAMPLES

The examples of the present invention will be described below. However, the present invention is not thereby limited to the following examples.

Preparation of Sample No. 1 to No. 8, and 13

A zeolite film structure according to Sample No. 1 is prepared in the following manner.

Firstly, 20 parts by mass of an inorganic binder 20 are added to 100 parts by mass of alumina particles 100 having an average particle diameter of 50 microns, then water, a dispersing agent and a thickener are added, and are kneaded to prepare a clay.

Next, a green body for a monolithic substrate that includes a plural through-holes is formed by extrusion molding of the clay. Then, the green body for the substrate is fired (1250 degrees C., 1 hour).

Then, an intermediate layer slurry is prepared by adding PVA (organic binder) to titania and alumina having an average particle diameter of 50 microns, and a green body for the intermediate layer is formed on an inner surface of each of the through holes by use of a filtration method. Next, the green body for the intermediate layer is fired (1250 degrees C., 2 hours) to form the intermediate layer. The support is completed in the above manner.

Then, a surface layer slurry is prepared by use of alumina having an average particle diameter of 0.3 microns to 0.6 microns (reference is made to Table 1), and a green body for the surface layer is formed on an inner surface of each of the intermediate layers by use of a filtration method or a flow-down method (reference is made to Table 1). In those samples that use a filtration method, PVA (an organic binder) is added to the alumina to thereby prepare the surface layer slurry. The amount of added PVA (organic binder) is adjusted for each sample to thereby adjust the surface roughness Ra of the surface layer as shown in Table 1. In those samples using a down-flow method, the surface layer slurry is adjusted without addition of PVA (organic binder) to the alumina. The down-flow method enables formation of a smoother surface layer than the filtration method. The time for pulverization of the surface layer slurry by a ball mill can be modified for each sample in order to adjust the surface roughness Ra of the surface layer as shown in Table 1. Then the green body for the surface layer is fired to thereby form the surface layer.

A DDR-type zeolite crystal (referred to below as seed crystal) for use as a nucleus is prepared based on the method disclosed in PCT Laid Open Application 2010/090049A1 by pulverizing the prepared DDR zeolite powder.

A slurry for seeding is prepared by dripping the dispersion in which the seed crystals are dispersed in water by use of a drip down method into ethanol, and stirring.

Next, the slurry for seeding is poured into a wide-mouthed funnel that is disposed above a support that is configured in a vertical position so that the slurry for seeding flows from the outlet of the wide-mouthed funnel into each through hole of the support. The slurry for seeding is dried by causing air flow at room temperature into each through hole.

Next, an ethylene diamine solution dissolving 1-adamantane amine into a silica dispersion is added and stirred, and then diluted by adding ion exchange water to the solution after stirring to thereby prepare a membrane-formation starting material solution.

Then, the alumina substrate with the seed crystals attached is placed in a stainless steel pressure-resistant container including an inner tube of fluorocarbon resin, the formulated membrane-formation starting material solution is added and heating (hydrothermal synthesis) is performed. In this manner, a DDR-type zeolite film that contains 1-adamantane amine is formed on an inner surface of the through holes of the support.

Then, the support formed a DDR-type zeolite film that contains 1-adamantane amine is heated to thereby combust and remove the 1-adamantane amine.

Next, 11.34 g of BTESE (bis-triethoxysilyl compound: structural formula $(C_2H_5O)_3SiC_nH_{2n}Si(C_2H_5O)_3$ ($n \geq 1$): Gelest Co.) and 29.53 g of ethanol are mixed and stirred while maintaining the water temperature 3 degrees C. (A). 0.56 g of nitric acid is added to 3.02 g of water (B). B is added dropwise into A, and stirred for 3 hours at 60 degrees C. (C). Ethanol is added to C and the solid content is configured as 0.12% mass % to 0.36 mass % (see Table 1) to thereby obtain a protective film starting material sol.

Then, in the same manner as the coating step for the slurry for seeding, the protective film starting material sol is allowed to flow to an inner side of the DDR-type zeolite film. Then, air at 23 degrees C. (dew point: −21 degrees C.) is caused to flow into each through hole at a wind speed of 7.5 m/s to thereby dry the protective film starting material sol.

Then, an organic-inorganic hybrid silica film is formed by firing the dried protective film starting material sol for 1 hour at 350 degrees C. in an $N_2$ atmosphere.

Preparation of Sample No. 9 to No. 12

Firstly a support and a DDR-type zeolite film are prepared by the same steps as Sample No. 1 to No. 8.

Next, 4.00 g of a phenol resin (Bellpearl 5899 Air Water Co., Ltd.) and 196.00 g of ethanol are mixed and stirred. Ethanol is added thereto and the solid content is configured as 0.12% mass % to 0.36 mass % (see Table 1) to obtain a protective film starting material sol.

Then, in the same manner as the coating step for the slurry for seeding, the protective film starting material sol is allowed to flow to an inner side of the DDR-type zeolite film. Then, air (dew point: −21 degrees C.) at 23 degrees C. is caused to flow into each through hole at a wind speed of 7.5 m/s to thereby dry the protective film starting material sol.

Then, a carbon film is formed by firing the dried protective film starting material sol for 1 hour at 500 degrees C. in an $N_2$ atmosphere.

Preparation of Sample No. 14

Firstly a support and a DDR-type zeolite film are prepared by the same steps as Sample No. 1 to No. 8, and a protective film that covers the DDR-type zeolite film is not formed.

Measurement of Surface Roughness Ra of Surface Layer

The surface roughness Ra of the surface that comes into contact with the DDR-type zeolite film is measured using a method that complies with JIS B0601 using a cross sectional curve having a length of 25 microns by SEM observation of a cross section of the surface of the surface layer in relation to each sample. The measurement results are shown in Table 1.

Measurement of Surface Roughness Ra of DDR-type Zeolite Separation Film

The surface roughness Ra of the surface that comes into contact with the protective film is measured using a method that complies with JIS B0601 using a cross sectional curve having a length of 25 microns by SEM observation of a cross section of the surface of the DDR-type zeolite film in relation to each sample. The measurement results are shown in Table 1.

Average Thickness of Protective Film

The arithmetic average for the thickness of 10 arbitrary positions that are observed by use of TEM with reference to a cross section of the protective film is calculated for Sample No. 1 to No. 13. The calculation results are shown in Table 1.

Measurement of Water Permeation Amount and Separation Coefficient

For each sample, a mixture of water and acetic acid at 90 degrees C. (weight ratio of each liquid 95:5) is supplied into the cells and water vapor that permeates the film at a pressure on the permeation side of the cells of 50 torr is recovered by use of an $N_2$ trap.

The composition of the recovered permeating liquid after 5 hours is analyzed by neutralization titration and used to calculate the water permeation amount and the concentration of acetic acid. Then the separation coefficient (alpha 5) is calculated based on the formula (permeating water concentration/permeating acetic acid concentration)/(supplied water concentration/supplied acetic acid concentration). The water permeation amount and the separation coefficient after five hours are shown in Table 1.

The composition of the recovered permeating liquid after 500 hours is analyzed by neutralization titration and used to calculate the water permeation amount and the concentration of acetic acid, and then the separation coefficient (alpha 500) is calculated based on the formula (permeating water concentration/permeating acetic acid concentration)/(supplied water concentration/supplied acetic acid concentration). A maintenance factor (alpha 500/alpha 5) is calculated for the separation coefficient after 500 hours (alpha 500) relative to the separation coefficient after 5 hours (alpha 5). The maintenance factor for the separation coefficient after 500 hours is shown in Table 1.

Peel Strength of Protective Film

A peeling structure test on the protective film is performed in relation to Sample No. 1 to No. 13 in order to measure the adhesive strength of the protective film and the zeolite film. More specifically, evaluation is performed by use of a stud pull peel strength measurement type thin film adhesion strength measuring instrument (Phottechnica Corp, trade Name: Romulus).

TABLE 1

| Sample No. | Surface Layer | | | DDR-type Zeolite | Protective Film | | | | Separation Test after 5 hrs | | Separation Test after 500 hrs |
|---|---|---|---|---|---|---|---|---|---|---|---|
| | Formation Method | Average Particle Diameter (um) | Surface Roughness Ra (um) | Film Surface Roughness Ra (um) | Material | Material Concentration (wt %) | Average Thickness (nm) | Peel Strength (kN/m) | Water Permeation Amount (kg/m² · h) | Separation Coefficient (—) | Separation Coefficient Maintenance Factor (%) |
| 1 | Flow-down Method | 0.5 | 0.38 | 0.36 | Organic-inorganic Hybrid Silica | 0.12 | 59 | 11 | 30.3 | 330 | 100 |
| 2 | Flow-down Method | 0.4 | 0.89 | 0.82 | Organic-inorganic Hybrid Silica | 0.12 | 78 | 12 | 30.6 | 303 | 100 |
| 3 | Filtration Method | 0.6 | 1.51 | 1.36 | Organic-inorganic Hybrid Silica | 0.12 | 91 | 12 | 29.4 | 269 | 100 |
| 4 | Flow-down Method | 0.5 | 0.84 | 0.71 | Organic-inorganic Hybrid Silica | 0.24 | 166 | 10 | 27.5 | 288 | 100 |
| 5 | Flow-down Method | 0.3 | 0.29 | 0.28 | Organic-inorganic Hybrid Silica | 0.12 | 44 | 8 | 31.4 | 345 | 79 |
| 6 | Filtration Method | 0.5 | 2.13 | 1.74 | Organic-inorganic Hybrid Silica | 0.12 | 115 | 9 | 33.1 | 92 | 95 |
| 7 | Filtration Method | 0.6 | 1.56 | 1.30 | Organic-inorganic Hybrid Silica | 0.04 | 34 | 8 | 27.6 | 287 | 68 |
| 8 | Flow-down Method | 0.6 | 0.44 | 0.42 | Organic-inorganic Hybrid Silica | 0.36 | 279 | 9 | 23.5 | 61 | 86 |
| 9 | Flow-down Method | 0.3 | 0.35 | 0.33 | Carbon | 0.12 | 69 | 10 | 29.9 | 392 | 100 |
| 10 | Filtration Method | 0.6 | 1.63 | 1.36 | Carbon | 0.12 | 98 | 10 | 31.0 | 363 | 100 |
| 11 | Flow-down Method | 0.4 | 0.76 | 0.69 | Carbon | 0.24 | 172 | 11 | 28.7 | 273 | 100 |
| 12 | Flow-down Method | 0.6 | 0.51 | 0.50 | Carbon | 0.36 | 299 | 8 | 27.9 | 49 | 72 |
| 13 | Filtration Method | 0.6 | 2.37 | 1.96 | Organic-inorganic Hybrid Silica | 0.12 | 145 | 3 | 29.7 | 341 | 62 |
| 14 | Flow-down Method | 0.4 | 0.39 | 0.38 | None | | | | 33.6 | 319 | 45 |

As shown in Table 1, in Sample No. 1 to No. 13 in which the zeolite film is covered by the protective film, the maintenance factor (alpha 500/alpha 5) of the separation coefficient is enhanced in comparison to Sample No. 14 in which a protective film is not formed. Therefore it is confirmed that the durability of the zeolite film structure is enhanced by formation of the protective film on the zeolite film.

In addition, in Sample No. 1 to 7, 9 to 11, and 13 in which the average thickness of the protective film is less than or equal to 172 nanometers, the separation coefficient after five hours (alpha 5) is enhanced in comparison to Sample No. 8 and 12 that have an average thickness in the protective film of greater than 172 nanometers. This feature is due to the fact that cracks in the protective film in the drying and firing steps are inhibited by restricting the thickness of the protective film.

In addition, in Sample No. 1 to 6 and 8 to 13 in which the average thickness of the protective film is greater than or equal to 44 nanometers, the maintenance factor (alpha 500/alpha 5) of the separation coefficient is enhanced in comparison to Sample No. 7 in which the average thickness of the protective film is less than 44 nanometers. This feature is due to the fact that peeling of the protective film during long-term use is inhibited by sufficient maintenance of the thickness of the protective film.

In addition, in Sample No. 1 to 12 in which the surface roughness Ra of the zeolite film is configured as less than or equal to 1.74 microns by configuring the surface roughness Ra of the surface layer to less than or equal to 2.13 microns, the peeling structure is enhanced in comparison to Sample No. 13 in which the surface roughness Ra of the zeolite film is configured as 1.96 microns. This feature is due to the fact that a uniform protective film thickness is created by reducing the surface roughness Ra and thereby the residual stress in the protective layer can be reduced.

INDUSTRIAL APPLICATION

According to the present invention, utility is enabled in the field of separation films due to enhancement to the durability of a zeolite film structure.

The invention claimed is:

1. A zeolite film structure comprising:
 a support,
 a zeolite film formed on a surface of the support, and
 a protective film formed on a surface of the zeolite film and configured from organic-nonorganic hybrid silica or carbon, wherein
 an average thickness of the protective film is less than or equal to 172 nanometers and greater than or equal to 44 nanometers.

2. The zeolite film structure according to claim 1, wherein a surface roughness Ra on the surface of the zeolite film is less than or equal to 1.74 micrometers.

3. The zeolite film structure according to claim 2, wherein a surface roughness Ra on the surface of the support is less than or equal to 2.13 micrometers.

4. The zeolite film structure according to claim 1, wherein a surface roughness Ra on the surface of the zeolite film is greater than or equal to 0.28 micrometers.

5. The zeolite film structure according to claim 4, wherein a surface roughness Ra on the surface of the support is greater than or equal to 0.29 micrometers.

* * * * *